United States Patent [19]
Yoneda et al.

[11] Patent Number: 4,643,289
[45] Date of Patent: Feb. 17, 1987

[54] WET CLUTCH DISC

[75] Inventors: Kazuhiko Yoneda, Katano; Seiichi Kitano, Shijounawate; Yoshinobu Fukuda, Osaka, all of Japan

[73] Assignee: Kabushiki Kaisha Daikin Seisakusho, Osaka, Japan

[21] Appl. No.: 753,926

[22] Filed: Jul. 11, 1985

[30] Foreign Application Priority Data

Jul. 11, 1984 [JP] Japan .................. 59-105454[U]

[51] Int. Cl.⁴ .................. F16D 3/14; F16D 13/74
[52] U.S. Cl. .................. 192/106.2; 192/70.12; 192/113 B; 464/7; 464/68
[58] Field of Search ............ 192/106.2, 70.12, 70.17, 192/113 B, 106.1; 464/68, 7

[56] References Cited

U.S. PATENT DOCUMENTS

| | | | |
|---|---|---|---|
| 2,523,501 | 9/1950 | Davies et al. | 192/113 B X |
| 2,636,363 | 4/1953 | Nutt | 192/106.2 X |
| 4,431,100 | 2/1984 | Kajikawa et al. | 192/106.2 |
| 4,485,907 | 12/1984 | Nishimura | 192/106.2 |

Primary Examiner—Rodney H. Bonck
Assistant Examiner—David A. Testardi
Attorney, Agent, or Firm—Burns, Doane, Swecker & Mathis

[57] ABSTRACT

A wet clutch disc has an output shaft, a hub, a radial flange provided at the hub, a pair of side plates connected through a spring to the flange, a friction facing being adapted to be pressed onto a flywheel and connected to one of the side plates, a friction mechanism disposed radially inside the spring, a lubricating oil feed passage provided inside the output shaft for feeding the lubricating oil and an outlet for supplying the lubricating oil to the friction facing and characterized in that the output shaft is provided with a passage for the friction mechanism extending from the feed passage to the inner periphery of the hub and the hub is provided with a passage connected to the passage for the friction mechanism in the output shaft and opening at the outer periphery of the hub.

3 Claims, 2 Drawing Figures

WET CLUTCH DISC

BACKGROUND OF THE INVENTION

The present invention relates to a wet clutch disc in which a friction facing is adapted to be lubricated by lubricating oil.

As shown in FIG. 2, which is a fragmentary sectional view, in a known wet clutch disc, an output shaft 1 is provided with passages 2 for feeding lubricating oil toward friction facings 3. However, in the known disc, since a part of the lubricating oil flowed from the passages 2 is ununiformly applied to friction washers 5, a frictional force of the washers 5 and a hysteresis torque caused thereby become unstable, so that torque vibration may not be absorbed effectively and a large noise may be generated in a driving system after a long use.

Further, in the known structure, when torsion springs 8 connecting a flange 6 of a hub and side plates 7 together are deformed radially outwardly by a centrifugal force, the springs 8 may undesirably engage with edges 9 of openings in the plates 7.

BRIEF SUMMARY OF THE INVENTION

Accordingly, it is an object of the invention to provide an improved wet clutch disc, overcoming the above-noted disadvantages.

According to the invention, a wet clutch disc comprises means for supplying oil to a friction surface for frictional engagement so as to cool them and reduce wear thereof and is characterized in that an output shaft and a hub connected thereto are provided with radially extending oil passages connected to an oil passage in the output shaft, so that the lubricating oil may be supplied directly to a damper mechanism including friction members and springs.

According to the above-noted structures, the lubricating oil is fed from the passage in the output shaft through the radial passages in the shaft and the hub to the inner peripheries of the friction members, so that the lubricating oil is uniformly applied to the whole friction area of the friction members.

Further, the lubricating oil flowed through the friction members reaches the the springs and members therearound, so that abnormal wear of the springs and the members therearound can be prevented.

Other and further objects, features and advantages of the invention will appear more fully from the following description of the preferred embodiments of the invention.

DETAILED DESCRIPTION OF THE PREFERRED EMBODIMENT

Figure 1:
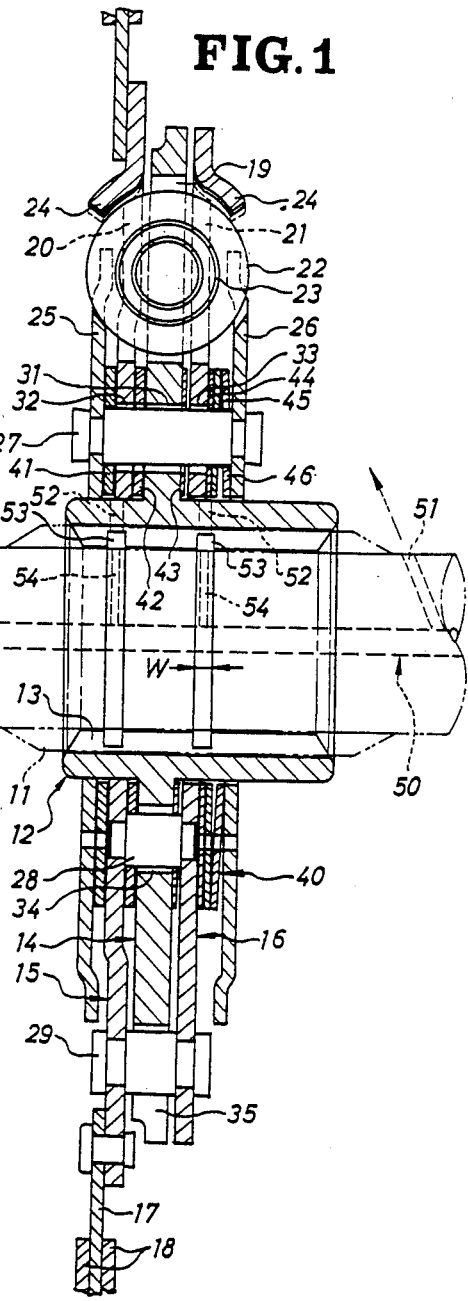
FIG. 1 is a fragmentary sectional view of an embodiment of the invention.
Figure 2:
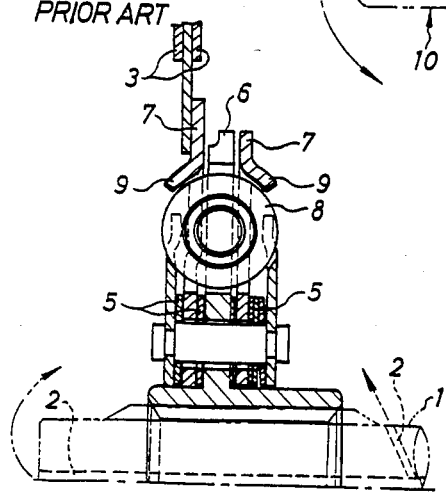
FIG. 2 is a fragmentary sectional view of a known wet clutch disc.

Known structures in an embodiment in FIG. 1 will be described first. Referring to FIG. 1, an output shaft 10 is provided with an outer spline 11, which meshes with an inner spline 13 of a hub 12. The hub 12 is provided with a radial flange 14, at opposite side of which are disposed annular side plates 15 and 16. Cushioning plates 17 are fixed to the outer peripheral portion of the side plate 15. Friction facings 18 are fixed to both surfaces of the cushioning plates 17. The facings 18 are positioned between a flywheel (not shown) of an engine and a pressure plate (not shown).

The flange 14 and the side plates 15 and 16 are provided at the radially outer portions with a plurality of substantially circumferentially extending openings 19, 20 and 21 (respectively one of them are illustrated), in which concentric double springs 22 and 23 are received to elastically connect the flange 14 and the side plates 15 and 16 together. Outer peripheral edges 24 of the openings 20 and 21 are bent oppositely to the flange 14 along the outer peripheries of the springs 22 to form guide means for preventing disengagement or drop of the the springs 22.

Although not illustrated clearly, the coil springs 22 and 23 are designed as follows so as to operate at two stages or steps in a torsion operation. In a neutral position, all of the springs 22 and 23 (second springs) except for the two small springs 23 (first springs) are supported only by the side edges of the openings 20 and 21 in the side plates 15 and 16, and are adapted to engage with the side edges of the opening 19 in the flange 14 when a torsion angle increases to a predetermined value. Said two first springs 23 are supported also by the side edges of the openings 19 in the flange 14 even in the neutral condition, and thus, are adapted to be compressed at any torsion condition.

Annular sub-plates 25 and 26 are disposed at opposite sides of the side plates 15 and 16. Radially inner portions of the subplates 25 and 26 are rigidly connected together by a plurality of sub-pins 27 (only one is illustrated) parallel to the output shaft 10. The side plates 15 and 16 are connected together at the radially inner portions by pins 28, and are connected together at the radially outer portions by stop pins 29. The flange 14 and side plates 15 and 16 are provided with circumferentially extending long apertures 31, 32 and 33 through which the pins 27 extend. The flange 14 is also provided with circumferentially long apertures 34 and recesses 35 through which the pins 28 and stop pins 29 extend, respectively. The dimensions of these long apertures and recesses are so determined that the numbers and parts may operate as will be detailed later.

A friction mechanism 40 is arranged at the radially inner portion of said disc. The friction mechanism 40 consists of a plurality of axially compressed annular members as follows. A friction washer 41 is interposed between the sub-plate 25 and the side plate 15. A friction washer 42 is interposed between the side plate 15 and the flange 14. A wave spring 43 is interposed between the flange 14 and the side plate 16. A friction washer 44, friction plate 45 and conical spring 46 are interposed between the side plate 16 and the sub-plate 26. The washers 41 and 44, plate 45 and conical spring 46 among said friction members are provided with apertures into which the pins 27 are closely fitted, and thus, are adapted to rotate or twist together with the sub-plates 25 and 26. Therefore, in the torsion operation detailed later, friction occurs at pressed surfaces of the washer 41 and side plate 15 and at pressed surfaces of the washer 44 and the side plate 16. The friction forces of the washers 41 and 44 are set larger than those of the washer 42 and the wave spring 43.

The output shaft 10 is provided with axially extending feed passage 50 for feeding lubricating oil. An inlet (not shown) of the passage 50 is connecting through another passage to a lubricating oil pump. At the near of the hub 12, the output shaft 10 is provided with outlets 51 communicating with the passage 50. The outlets 51 are disposed at axially opposite sides of the hub 12, and one of the outlets 51 is opened at the end of the output shaft 51. The other outlet 51 is opened at the outer peripheral surface of the output shaft 10.

The structures described above are known.

In such disc, according to the present invention, the hub 12 is also provided with radially extending oil passages 52, which are axially spaced. One, or a plurality of, circumferentially spaced passages 52 may be arranged at axially one position. One or some of the passages 52 open at the outer periphery of the hub 12 radially inside the pressed surfaces of the washer 41 and the side plate 15. Other passage or passages 52 open at the outer periphery of the hub 12 radially inside the pressed surfaces of the washer 44 and the side plate 16. Ends of the passages 52 near the output shaft 10 open at the bottoms between the teeth of the spline 13. The spline 13 is provided with annularly extending grooves 53 connecting to the passages 52. The output shaft 10 is provided with oil passages 54 extending radially from the passage 50 to the grooves 53. The axial width W of each groove 53 is larger than a diameter of the corresponding passage 54, so that the passage 54 can be connected to the grooves 54 even when the disc axially moves in accordance with engaging and disengaging operation of the clutch.

Further, in order to position the side plates 15 and 16 concentrically to the hub 12, the side plate 15 is closely fitted at the inner periphery to the hub 12. The side plate 16 is positioned concentrically to the hub 12 through the stop pins 29 and the side plate 15 and is spaced at the inner periphery to the hub 12 with an annular space therebetween.

An operation is as follows.

When the pressure plate presses the facing 18 onto the flywheel, a torque of the engine is transmitted from the flywheel through the facing 18 to the side plate 15, and then, is transmitted from the side plates 15 and 16 through the springs 22, 23, the flange 14 and the hub 12 to the output shaft 10. In this operation, the springs 22 and 23 are compressed, and thus, the side plates 15 and 16 twist or torsionally turn with respect to the flange 14. As described before, the springs 22 and 23 operate at two steps. The torsion angle may changes rapidly in accordance with a small change of the torque and an inclination of a damping characteristic line becomes small when the torque is small. When the torque is large, the inclination of the damping characteristic line becomes large, and the increasing rate of the torsion angle with respect to the increasing of the torque becomes small.

In a first stage of the above operation, i.e., when the torque is small, the sub-plate 25 and 26, the washers 41 and 44, the friction plate 45 and the conical spring 46 twist together with the side plates 15 and 16 with respect to the flange 14. Therefore, the friction occurs on the surfaces of the friction washer 42 and the wave spring 43, and thus, a small hysteresis torque is generated in a first damping characteristic. In a second torsion operation, the pins 27 contact the edges of the long apertures 31 in the flange 14, and thus the sub-plates 25 and 26 are unrotatably connected to the flange 14 through the pins 27. Therefore, the side plates 15 and 16 twist with respect to the flange 14 and the sub-plates 25 and 26, so that friction occurs on the pressed surfaces of the friction washer 41 and the side plate 15 and the pressed surfaces of the friction washer 44 and the side plate 16 as well as the pressed surfaces of the friction washer 42 and the flange 14 and the pressed surfaces of the wave spring 43 and the flange 14. This friction causes a large hysteresis torque in a second damping characteristic.

As described above, the damping characteristic and the hysteresis torque characteristic are stepped, so that the torque vibration can be effectively absorbed through the whole torque area, and thus, noises in a driving system can be prevented.

When the torsion angle increases to a maximum value, the stop pins 29 contact the edges of the recesses 35, and thus, further torsion can be prevented.

In the above operation, lubricating oil fed into the passage 50 are spurted from the outlets 51 onto the surfaces of the facings 18 to cool and lubricate them. A part of the lubricating oil in the passage 50 flows through the passages 54, the grooves 53 and the passages 52 to the inner periphery of the friction mechanism 40 and lubricate the surfaces of the friction members, so that abnormal wear of the friction members can be prevented. Since the passages 52 supply the lubricating oil to the inner periphery of the friction mechanism 40, a sufficient amount of the oil spreads substantially uniformly over the surfaces of the all friction members in accordance with the rotation of the disc. Therefore, the friction force of the friction mechanism 40 can be stable, and thus, the intended hysteresis torque can always be obtained.

Further, in the illustrated embodiment, the passages 52 open toward the pressed surfaces of the friction washer 41 and the side plate 15 and the pressed surfaces of the friction washer 44 and the side plates 16, which are sliding areas generating the large friction force. Therefore, these surfaces causing the large friction force are lubricated by the large amount of oil, and thus, the hysteresis torque can be surely stable. Further, a part of the lubricating oil flowed from the passages 52 flows radially inside the inner peripheries of the side plates 15 and 16 onto the friction washers 42 and the wave springs 43 to lubricate them.

Since the wave spring 43 is pressed only at its convex portions onto the flange 14 and the side plate 16, the convex portions receive a larger pressure than the surface of the washer 42. However, as described above, a rather wide annular space is formed between the inner periphery of the side plate 16 and the hub 12. Therefore, the lubricating oil flowed from the passage 52 near the side plate 16 flows through the annular space onto the surfaces of the wave spring 43, and thus, the spring 43 can be lubricated by the large amount of oil. Therefore, the fretting and abnormal wear of the spring 43 can surely be prevented, although it receives the large pressure.

The lubricating oil, which lubricated the friction mechanism 40 as described above, flows onto the springs 22 by the centrifugal force. Therefore, even if the the springs 22 are moved radially outwardly by the centrifugal force to contact the edges 24, the contact portions can be lubricated by the lubricating oil, and thus, are prevented from abnormally engaging and fretting together.

According to the invention, as described above, since the lubricating oil is supplied from the passages 52 in the hub 12 to the friction mechanism 40, the friction surfaces of the friction mechanism 40 can be lubricated sufficiently and uniformly, so that the hysteresis torque can be stable, and thus, the intended effect for absorbing the torque vibration can always be obtained.

Further, since the lubricating oil lubricates the contact portions of the springs 22 and the edges 24 after lubricating the friction mechanism 40, the contact portions can also be prevented from abnormally engaging and fretting together.

The sliding surfaces of the splines 11 and 13 can advantageously be lubricated by the oil leaked from the grooves 53.

Although the invention has been described in its preferred form with a certain degree of particularity, it is understood that the present disclosure of the preferred form may been changed in the details of construction and the combination and arrangement of parts may be changed to without departing from the spirit and scope of the invention as hereinafter claimed:

What is claimed is:

1. A wet clutch disc comprising an output shaft; a hub connected to the output shaft through a spline; a radial flange provided at the hub; a pair of side plates rotatably fitted to the outer periphery of the hub on opposite sides of the flange with outer portions rigidly connected together; a pair of sub-plates rotatably fitted to the outer periphery of the hub on opposite sides of the side plates and connected together, one of said side plates having an internal diameter greater than an outside diameter of the hub radially aligned therewith so as to define a radial clearance between the hub and the one of said side plates; a spring disposed in openings in the flange, the sub-plates, and the side plates and circumferentially connecting the side plates to the flange; a friction facing being adapted to be pressed against a flywheel and connected to one of the side plates; a first friction mechanism disposed radially inside the spring at opposite sides of the flange and being adapted to slide with respect to the flange in accordance with torsion operation of the side plates with respect to the flange; a second friction mechanism disposed radially inside the spring between the side plates and the sub-plates, fixed to the sub-plates so as to move therewith, slidable with respect to the side plates, and operable to exert a greater frictional force than said first friction mechanism; a lubricating oil feed passage provided inside the output shaft for feeding the lubricating oil and an outlet connected to said feed passage and opening at the outside surface of the output shaft at a location axially spaced from said hub for supplying the lubricating oil to the friction facing;

said output shaft is provided with a shaft oil passage extending from said feed passage to the inner periphery of the hub for delivering oil to the friction mechanism, said hub is provided with spline teeth and an annular groove connected to said shaft oil passage, so that the lubricating oil leaked from the groove may be supplied onto surfaces of teeth of the spline, and said hub is provided with a hub oil passage communicating with said shaft oil passage in the output shaft and opening at the outer periphery of the hub in general radial alignment with sliding surfaces between said second friction mechanism and said side plates and in fluid communication with the radial clearance between the one sub-plate and the hub, so that the lubricating oil from the feed passage can flow through the shaft oil passage and the hub oil passage and may be supplied to the sliding surfaces of said second friction mechanism and through the radial clearance to the first friction mechanism, and further, may be supplied through the second friction mechanism to an area between said spring and the edges of the openings.

2. The wet clutch disc as claimed in claim 1 wherein a second shaft oil passage is provided in the output shaft and is axially spaced from said first shaft oil passage, and a second hub oil passage is in general radial alignment with the second shaft oil passage, the hub oil passages for the friction mechanism open at positions spaced from the flange.

3. The wet clutch disc as claimed in claim 1 wherein the pair of sub-plates are adapted to twist relatively to the side plates only when a torsion angle of the side plates to the flange is larger than a predetermined value, the sub-plates are disposed axially outside the side plates, said second friction mechanism includes friction members having a large friction force and interposed between the side plates and the sub-plates adjacent thereto and said first friction mechanism has friction members having a small friction force disposed between the flange and both side plates, the inner periphery of one of said side plates contacts the outer periphery of the hub, said hub oil passages open at positions near the friction members having the large friction force, said friction member between the flange and the side plate defining said radial clearance consists of a wave spring pressed only at circumferentially spaced convex portions thereof to the flange and the side plate and a passage for connecting said passage for the friction mechanism to the wave spring is formed by said radial clearance.

* * * * *